Figure 1:
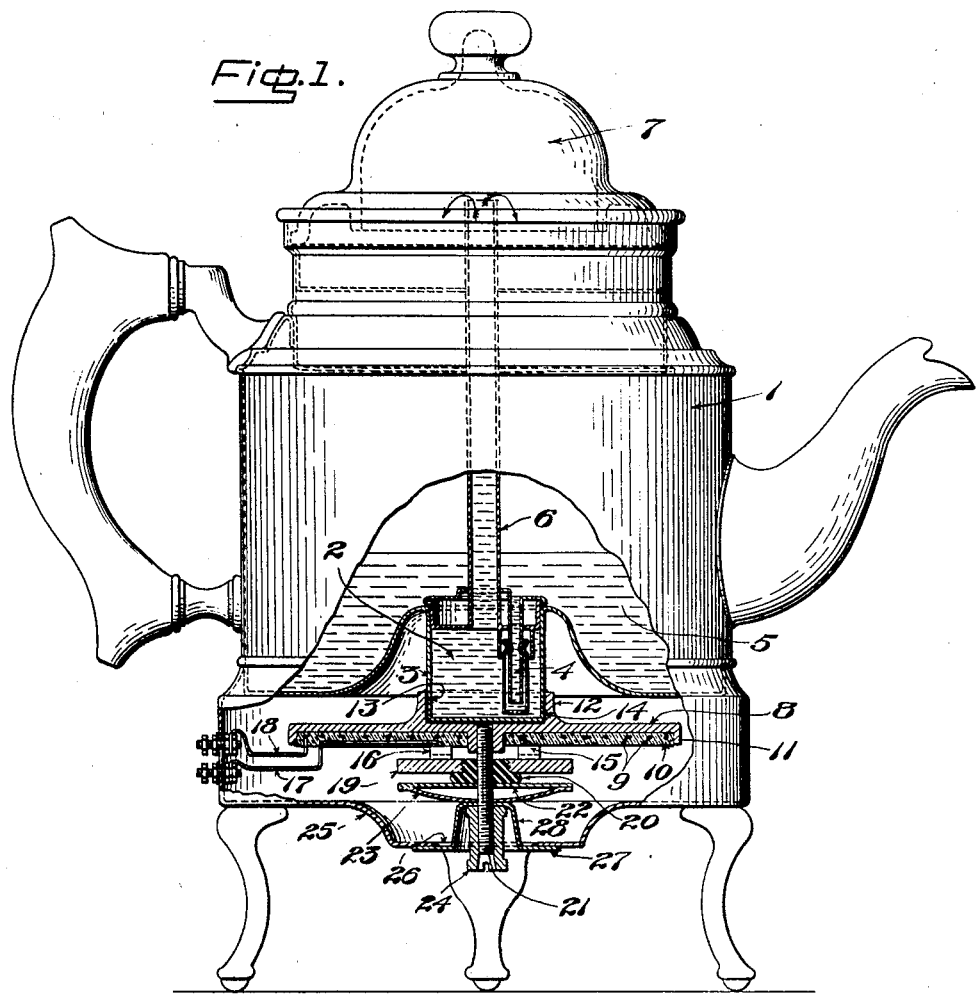

H. B. GALE.
ELECTRICALLY HEATED APPARATUS.
APPLICATION FILED FEB. 28, 1910.

965,449.

Patented July 26, 1910.

Witnesses:
M. G. Crozier
Wm. J. Pike

Inventor,
Horace B. Gale.
by Geo. S. Maxwell, Atty

UNITED STATES PATENT OFFICE.

HORACE B. GALE, OF NATICK, MASSACHUSETTS, ASSIGNOR TO SIMPLEX ELECTRIC HEATING COMPANY, OF BOSTON, MASSACHUSETTS, A CORPORATION OF MASSACHUSETTS.

ELECTRICALLY-HEATED APPARATUS.

965,449.  Specification of Letters Patent. Patented July 26, 1910.

Application filed February 28, 1910. Serial No. 546,394.

*To all whom it may concern:*

Be it known that I, HORACE B. GALE, a citizen of the United States, residing at Natick, in the county of Middlesex and State of Massachusetts, have invented an Improvement in Electrically-Heated Apparatus, of which the following description, in connection with the accompanying drawings, is a specification, like numerals on the drawings representing like parts.

My invention relates to electrically heated vessels adapted to hold substances to be heated, such as liquids, fusible substances, etc., and is applicable, for example, to many cooking utensils, to glue heaters, and to vessels for heating chemical substances which corrode common metals. Such vessels are necessarily adapted in shape and material to the various substances to be heated in them and to the conditions of use, and the shapes and materials best adapted to these conditions are often not adapted to the efficient attachment of an electric heater.

The main object of my invention is to provide a convenient and efficient means for applying electric heat to such vessels. For this purpose, I provide a metal receptacle adapted on a portion of its surface, preferably the upper side, to fit approximately the outside of the vessel, and on another part of its surface, preferably the under-side, to receive an electric heating resistance,—the metal receptacle serving as an intermediate reservoir of heat and as a heat-transmitting medium between the heating resistance and the vessel.

In order to provide efficient heat conduction between the receptacle and the outside of the vessel to be heated, I form the upper side of the receptacle with a recess or hollow portion, bounded by a raised rim, so that it will retain a fluid by gravity when in its normal working position; and I fill the space between the interior surface of this recessed portion and the bottom of the vessel with a substance fusible at a lower temperature than either the vessel or the receptacle, this substance being introduced in a fused state and allowed to harden so as to fill completely the space between the vessel and receptacle, and give the best possible contact for heat transmission. This intermediate substance may be used as a means of attaching the vessel to the receptacle, or the attachment may be by other means, and the substance used simply as a filler. In this case, it is desirable that the substance should not shrink on solidifying, but should preferably have a slight expansion, so that it may completely fill the space. Type metal is a substance well adapted for this purpose in many cases; but I do not limit myself to any particular substance, except that it should be fusible, as above described, and a good conductor of heat. When the fusible substance is used as a means of attaching the receptacle to the vessel, I supply additional means to prevent its being overheated and fused by the application of electric heat; otherwise the apparatus will not usually be injured by the fusing of this substance, as it is retained in place in the manner described and will solidify again on cooling.

The metal receptacle I make preferably of iron, which is efficient as a conductor and reservoir of heat, and well adapted to the efficient attachment to it of an electric heating resistance by means of a vitreous enamel.

I have illustrated my invention as applied to a coffee percolator. This type of utensil requires that the heat be applied directly only to a very small area in the middle of the bottom, which surface is neither large enough nor of suitable material, for the direct application of an electric heater by means of enamel or similar means.

Figure 2:
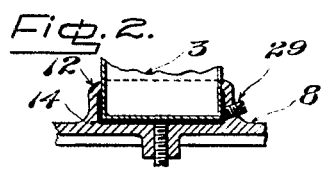

In the drawings, Figure 1 is a view in side elevation of a recognized commercial coffee percolator, having my invention applied thereto as shown in cross section; and Fig. 2 is a sectional detail showing a further application of one feature of my invention.

In the drawings I have shown one form of coffee percolator 1 which has become well recognized on the market, my invention being shown applied thereto in the sectional and broken away portion of Fig. 1, and accordingly it is unnecessary to describe the general details of the percolator itself, it being sufficient to explain that a segregated portion 2 of water is fed into a depending cup or steam generator 3 through a water seal inlet 4 (which prevents the improper escape of steam therethrough) from a main body of water 5 contained in the coffee pot or percolator. The small body 2 of water is partially generated into steam by heat applied locally to its lower end, said steam driving the water upwardly through the pipe 6 into the dome 7, whence it sprays down over the coffee and percolates therethrough in well known manner.

As a medium for applying heat generated by electricity to the base of the cup 3 I provide a metal plate 8 of relatively large area, having resistance wires 9 embedded close to the under side of the plate in enamel 10 within the peripheral edge 11 of the plate. On its upper side the plate is provided with a flange 12 and recess 13 within which the cup 3 has a loose fit. The lower side of the plate 8 is thus adapted in shape to receive the electric heating wires 9 and of sufficient area to transmit the heat generated in them efficiently to the plate 8 through the relatively poorly conducting layer of enamel 10, while, by reason of the recess 13 on its upper side, the plate 8 forms a receptacle for the bottom of the vessel to be heated.

To transmit effectively the heat received on the relatively large area of the bottom of the receptacle 8 to the water 2 through the relatively small area of the base of the cup 3 requires the most intimate metallic contact possible between the receptacle and the cup. To secure this, a fused material, preferably a metal, fusible at a lower temperature than either the plate 8 or the cup 3, is placed in the recess 13 and maintained fluid therein by heat applied to the plate 8 while the latter is shoved against the bottom of the cup 3, or in other words while the bottom end of the cup is inserted in the recess 13. As the cup 3 is forced hard down against the fluid metal a portion of the latter is thereby forced upwardly about the cup 3 entirely closing and sealing whatever space may exist between the inner wall of the flange 12 and the outer surface of the cup 3 as indicated at 14, where the said fluid metal is retained by gravity until it hardens, and thereby secures together the heat-conducting plate 8 and the vessel to be heated with a perfect metallic contact, so that, for heat-conductive purposes, the plate 8 is practically integral with the cup 3.

The fusible metal between the two parts is preferably of a nature which expands as it hardens, for example, type metal, so that the joint tends to become even tighter and more perfect as the fused metal hardens or sets.

While the primary purpose of this part of my invention is to provide means for securing perfect heat conduction to an extent not possible by means of an ordinary mechanical tight fit, the invention has the further advantage of permitting a cheap construction, as the parts may be relatively rough. Moreover by providing a receptacle 13 for the melted metal in which it is retained by gravity, the operation of soldering is made easy and a perfect result insured.

The heater plate 8 may be secured to the cup 3 by additional means, for example by a set-screw, shown at 29, Fig. 2, so that, should the fusible metal 14 become accidentally melted by overheating of the plate 8 while in use, the plate and cup will remain in proper relative position, the fused metal 14 being held in the recess 13 by gravity. When the heat is cut off it will again harden in position, leaving the conductive joint between the receptacle and cup unimpaired.

In many cases it is desirable to provide automatic means to prevent the over-heating of the vessel or its contents, especially in the case of vessels of the class illustrated in Fig. 1, which generally have a number of soldered joints that might be melted by application of heat in absence of water in the vessel. For this purpose I provide an improved form of automatic electrical cut-off mechanism shown in Fig. 1, mounted on the bottom of the plate 8.

The coffee pot 1 is provided with an outer, or false, bottom 25 having a central opening 26 fitted with a cap 27 adapted to close the same. The cap preferably has a central depressed portion 28 which projects inside the false bottom 25 when the cap is in position to close the opening 26, as shown.

Two copper contacts 15, 16, project downwardly from the enamel 10, the former connecting with the inner terminal of the resistance 9 and the latter completing the circuit through a wire 17 herein shown as adjacent the terminal 18 of the resistance wire. Spanning these contacts is a copper disk 19 supported by an insulating button 20 which is loosely fitted so as to slide freely on a central threaded post 21 depending from the plate 8, said disk 19 and its insulation 20 being held up by a flat washer 22 and a spring washer 23 also loose on said threaded post.

The spring washer 23 is supported by the closing-cap 27 which is in turn supported and clamped against the false bottom 25 by the nut 24. This nut is made of an alloy which is fusible at a lower temperature than the metal 14.

In use, the circuit being closed, the resistance 9 which is held in intimate heating relation to the heat conducting plate 8, rapidly heats said plate, which stores and conducts the heat to its central portion, where the heat is applied directly to the water 2 in the steam chamber 3, and the utmost efficiency of heat conduction is maintained by the thin layer 14 of fusible metal which intervenes at the joint.

The metal 14, being separated from the water 2 only by the thin wall of the cup 3, is kept nearly at the same temperature as the water, and cannot be heated much above the boiling point while there is water in the cup 3. Under these conditions the metal 14 cannot be melted; but, should the water boil out of the cup 3 while the current continues to flow in the resistance wires 9, the metal 14 will be overheated, and, if the current were continued, would be melted. The metal 14 would however be retained in the recess 13 by gravity, while the heat would be conducted upward by the cup 3 to the body of the coffee-pot 1, which would thus become overheated and might be injured. Such overheating and injury is prevented by the combination shown in Fig. 1 in the following way. When the temperature of the plate 8 begins to rise above its normal limit, the heat from the plate is conducted down the central post 21 to the fusible nut 24, which melts at a temperature below that of the metal 14, and drops off the stud, allowing the cap 27 to fall and the washers 22 and 23 to drop to the bottom of the vessel 25, which allows the disk 19 to drop away from the contacts 15 and 16 far enough to open the circuit through the heating wires 9, thus cutting off the heat.

The parts can be readily restored to working position by replacing the cap 27 and screwing on a new fusible nut 24.

The spring washer 23 serves several useful purposes. It holds the contact-disk 19 securely pressed against the contacts 15 and 16, while yielding to the pressure of the cap 27 sufficiently to allow it to be clamped firmly against the bottom 25 by the nut 24, so as to close the opening 26. The cap 27 thus protects the electrical connections inside the bottom 25 from injury by water in case the utensil is dipped in water. The spring washer 23 also insures a quick breaking of the circuit at the contacts 15 and 16 in case of overheating, as it holds the disk 19 in contact until the nut 24 has yielded sufficiently to drop completely off the post 21, when the disk 19 drops quickly, instead of drawing away gradually from the contacts 15 and 16 as the nut begins to soften.

As already stated, I wish it understood that my invention is not limited to the precise constructional details herein shown, as various features thereof may be carried out in a variety of widely different embodiments, as will be more evident from the following claims, in which I have more particularly defined the invention.

Having described my invention, what I claim as new and desire to secure by Letters Patent is, 1. In an electrically heated apparatus, the combination with the part to be heated, of a metal receptacle having electric heating means in heat-conductive relation thereto, and provided with a recess in its upper side approximately fitting the said part to be heated, and a heat conducting body fusible at a lower temperature than said part or said receptacle filling the space between them, for maintaining conditions of maximum heat conduction.

2. An electrically heated apparatus, comprising a vessel for holding the substance to be heated, a heat-conveying part having electrical heating means secured directly thereto, said apparatus having a cavity provided between the outside of said vessel and said heat-conveying part adapted to retain a fused substance by gravity, and a substance fusible at a lower temperature than either said part or said vessel filling said cavity.

3. An electrically heated apparatus, having a depending portion to which the heat is to be applied, a heat retaining and conveying part having electrical heating means secured directly thereto, a cavity being provided between said depending portion and said part, and fusible metal filling said cavity.

4. An electrically heated apparatus, having a depending portion to which the heat is to be applied, a heat retaining and conveying part having electrical heating means secured directly thereto, a cavity being provided between said depending portion and said part, and fusible metal filling said cavity, said metal having the property of expanding as it hardens.

5. An electrically heated apparatus comprising a vessel for holding the substance to be heated, a separate heat-conveying part having electric heating means secured directly thereto, said heat-conveying part having a cavity in its upper side approximately fitting the lower part of said vessel, and adapted to retain a fusible substance by gravity, and a fusible metal securing said separate heat-conveying part directly to said vessel.

6. An electrically heated apparatus, having a depending portion to which the heat is to be applied, a heat retaining and conveying part having electrical heating means enameled directly thereon, and a recess on its upper side adapted to retain a fluid substance by gravity, approximately fitting said depending portion, and fusible metal filling the cavity between said depending portion and the inside of said recess.

7. An electrically heated apparatus, having a body provided at its bottom with a depending liquid-containing cup, a laterally extending heating plate having a cup-shaped recess in its upper side for receiving said liquid-containing cup, a filling of fusible metal in said recess betwen said cup and plate, and electric heating means attached to the bottom of said plate.

8. An electrically heated apparatus, having a body provided at its bottom with a depending liquid-containing cup, a horizontal heating plate having a central annular flange projecting from its upper side and forming a cup-shaped recess adapted to fit the bottom of said depending cup, fusible metal securing said cup within said cup-shaped recess, and electric resistance wires enameled on the under side of said horizontal plate.

9. An electrically heated apparatus, comprising a water-containing receptacle, a resistance plate at the bottom of said receptacle for electrically heating the latter, said apparatus having an inclosure below the said bottom for inclosing the electric heating means, provided on its under side with an opening, a fusible cut-out secured to and depending from the under side of said resistance plate, and a closing cap held in place by said fusible cut-out for closing said opening.

10. An electrically heated apparatus, comprising a water-containing receptacle, a resistance plate at the bottom of said receptacle for electrically heating the latter, said apparatus having an inclosure below the said bottom for inclosing the electric heating means, provided on its under side with an opening, a fusible cut-out secured to and depending from the under side of said resistance plate, and a closing cap having its peripheral edges overlapping the under edges of said opening and held in place by said fusible cut-out.

11. An electrically heated apparatus, comprising a water-containing receptacle, a resistance plate at the bottom of said receptacle for electrically heating the latter, said apparatus having an inclosure below the said bottom for inclosing the electric heating means, provided on its under side with an opening, a fusible cut-out secured to and depending from the under side of said resistance plate, and a cup-shaped closing cap having its peripheral edges overlapping the end edges of said opening and held in place by said fusible cut-out, a portion of the latter occupying the cupped portion of the cap.

12. An electrically heated apparatus, comprising a water-containing receptacle, a resistance plate at the bottom of said receptacle for electrically heating the latter, and a fusible cut-out depending from said plate, including a threaded post, a contact-making member, a fusible nut having threaded engagement with the free end of said post, and a spring member interposed between said nut and said contact-making member for retaining the parts in operative position when under compression.

In testimony whereof, I have signed my name to this specification, in the presence of two subscribing witnesses.

HORACE B. GALE.

Witnesses:
MACALLASTER MOORE,
FRANK W. HEWITT.